March 16, 1965     W. ABOUREZK     3,174,151

PULSE SYNCHRONIZING SYSTEM

Filed Nov. 25, 1959

INVENTOR
WILLIAM ABOUREZK
BY
ATTORNEY

United States Patent Office 3,174,151
Patented Mar. 16, 1965

3,174,151
PULSE SYNCHRONIZING SYSTEM
William Abourezk, Huntington Station, N.Y., assignor to Sperry Rand Corporation, Great Neck, N.Y., a corporation of Delaware
Filed Nov. 25, 1959, Ser. No. 855,454
8 Claims. (Cl. 343—103)

The present invention generally relates to pulse synchronizing systems and, more particularly, to such a system for unambiguously synchronizing a locally generated pulse with a predetermined point on the envelope of the first pulse of a recurrent group of received pulses.

In certain pulse communication systems it is desired to synchronize a recurrent series of pulses locally generated in a mobile receiver with a corresponding recurrent series of received pulses. For example, in the case of loran navigation systems, the position of a receiver carried aboard a vehicle is determined by measuring the time difference between the receptions of so-called "master" and "slave" transmitted pulses. The time difference measurement locates the receiver along a hyperbolic line of position relative to the known sites of the master and slave pulse transmitters.

In order to effect the time difference measurement, a first recurrent series of pulses, locally generated in the receiver, is aligned with the detected master pulses. Similarly, a second recurrent series of pulses locally generated in the receiver is aligned with the detected slave pulses. The second recurrent series of locally generated pulses customarily is derived from the first recurrent series by introducing a calibrated variable amount of time delay in the first series of locally generated pulses. After the first series of pulses has been synchronized with the detected master pulses, the time delay necessary to synchronize the second series of pulses with the detected slave pulses is a direct measure of the time difference which is to be determined.

One of the difficulties in achieving synchronization between the received detected pulses and the locally generated pulses in a loran system is attributable to "skywave" effect. As is well understood, sky waves are produced upon the reflection of transmitted electromagnetic energy by ionized atmospheric layers. Because of the varying altitude of the reflecting ionized layers, the time of arrival of the reflected pulse energy at the location of the remote mobile receiver is not solely a function of the distance separating the transmitter and receiver. It is accordingly desirable, in order to eliminate time difference measurement inaccuracy attributable to inadvertent synchronization with received sky waves, that means be provided for sensing the establishment of such synchronization.

One solution to the problem of avoiding inadvertent sky wave synchronization is disclosed in U.S. Patent 2,794,979 issued on June 4, 1957 in the name of Winslow Palmer and assigned to the present assignee. The patented system is based upon the principle that sky waves are received subsequent to the corresponding ground waves because the sky wave signal propagation path is always the longer one. A signal policing circuit is provided which is actuated during each received signal repetition interval in advance of the actuation of the receiver synchronization circuits. The purpose of the policing circuit is to determine the presence of any signals prior to the occurrence of the signals being synchronized with. The detection by the policing circuit of any such signals is interpreted as an indication that synchronization has been achieved on the later occurring sky wave signals.

The present invention utilizes policing circuit techniques similar to that taught in the aforementioned patent but also takes into account a further source of possible error not contemplated by the prior art. The additional source of error is attributable to the action of automatic gain control circuits included in the prior art receivers which regulate receiver gain as a function of the strength of the signals with which the locally generated pulses are being synchronized.

Particularly during night periods of reception, sky wave signal amplitude substantially exceeds that of the desired ground waves. Accordingly, the automatic gain control circuits which are sensitive to the amplitude of the received signal being synchronized with tend to reduce receiver gain to such a level as to render the policing circuits insensitive to the presence of the earlier occurring but lower amplitude ground wave signals. The result is that improper sky wave synchronization is not sensed.

It is the principal object of the present invention to provide an improved pulse synchronization system for a signal receiver.

Another object is to provide a pulse synchronizing system which minimizes the likelihood of improper synchronization in the event that the amplitudes of undesired received pulses are substantially greater than those of the desired received pulses.

A further object is to provide a policing circuit for a receiver synchronizer wherein the sensitivity of the policing circuit is made a function of the amplitude of the average noise level in the receiver.

These and other objects of the present invention, as will appear from a reading of the following specification, are achieved in a representative embodiment by the provision of means for receiving and detecting a first recurrent series of transmitted pulsed signals. Means are provided for locally generating a second recurrent series of pulses and for synchronizing the same with the detected pulsed signals. The synchronized second series of pulses are generated by introducing a predetermined amount of delay in a locally generated third series of recurrent pulses.

Apparatus is included for sampling the received signals at times corresponding to the occurrences of the third series of pulses. The output of the sampling means is applied to a warning indicator via a coupling circuit having controllable threshold value. The warning indicator is actuated whenever the amplitude of the signal output of the sampling means exceeds the controllable threshold value. The threshold, itself, is established in accordance with the magnitude of the average receiver noise signal. As a result, the warning indicator remains maximally sensitive to the output of the sampling means at all times irrespective of changes in gain of the receiving means.

For a more complete understanding of the present invention, reference should be had to the following specification and to the drawings of which:

Figure 1:
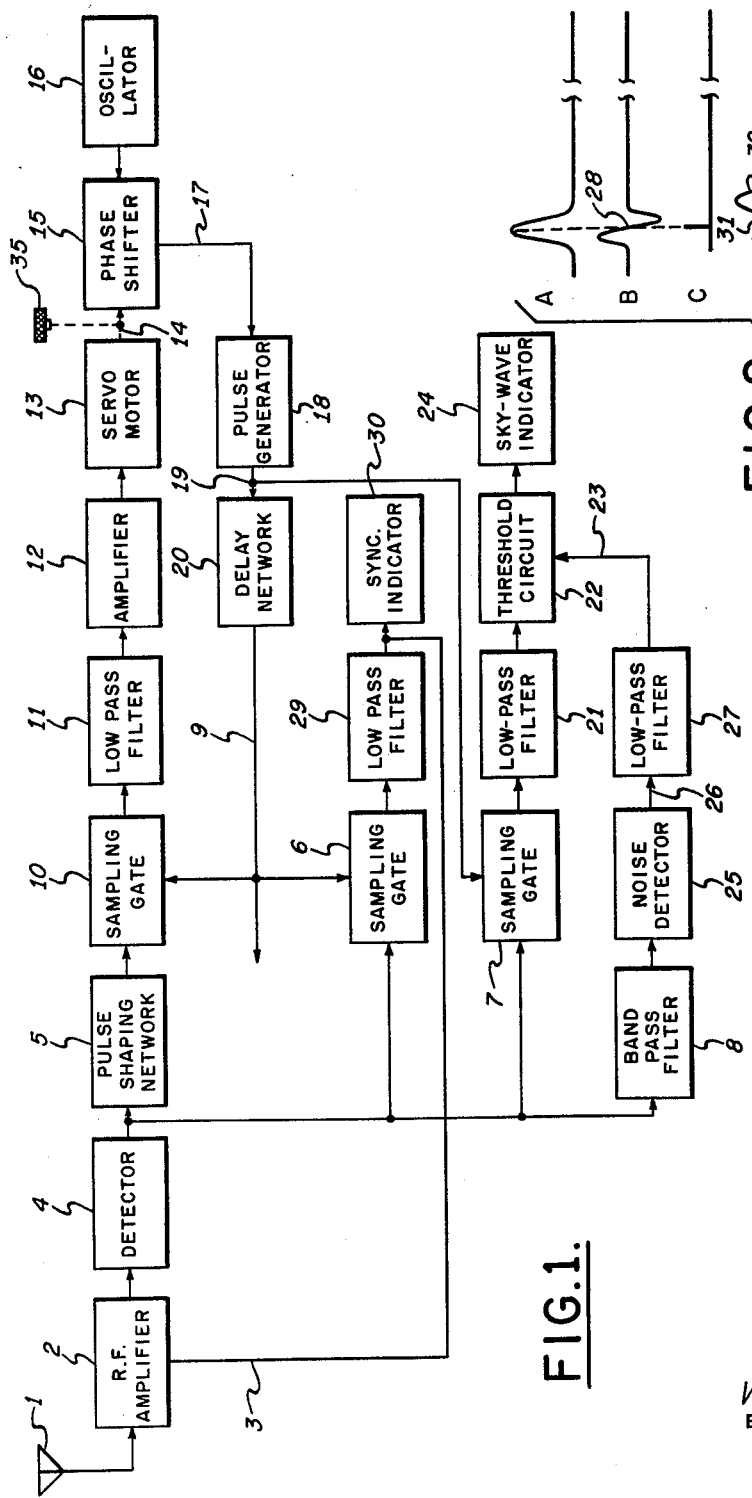
FIG. 1 is a block diagram of a representative embodiment of the invention.

In FIG. 1, pulses of remotely transmitted electromagnetic energy are received by antenna 1 and amplified in RF amplifier 2. The signal gain afforded by amplifier 2 is controlled in accordance with an automatic gain control voltage appearing on line 3. The signals at the output of amplifier 2 are detected in a conventional amplitude detector 4 and then applied, after detection, to pulse shaping network 5, to sampling gate 6, to sampling gate 7, and to band-pass filter 8.

Network 5, to be more fully described later, shapes the unidirectional detected pulses at the output of detector 4 to produce bidirectional pulses having a zero crossover value suitable for the synchronization of the locally generated series of pulses appearing on line 9. The shaped pulses at the output of network 5 and the locally generated pulses of line 9 are applied to sampling gate 10. Gate 10 is rendered conductive by the pulses of line 9 to permit the passage of the shaped pulses at the output of detector 4 during the occurrences of the pulses on line 9. The sampled pulses at the output of gate 10 are of a polarity indicative of the relative time displacement between the pulses of line 9 and the occurrences of the zero crossover value of the shaped pulses at the output of network 5. The unipolar output pulses of gate 10 are applied to low-pass filter 11 which extracts and passes substantially only the D.C. component of the unipolar pulses at the output of gate 10. The D.C. signal at the output of filter 11 is amplified in amplifier 12 and then applied to energize servomotor 13.

Shaft 14 of motor 13 positions electromechanical phase shifter 15 which receives an electrical input signal from oscillator 16. The frequency of oscillator 16 nominally is at the repetition frequency of the pulses received by antenna 1. Phase shifter 15 introduces a time delay between the occurrence of the output signal of oscillator 16 and the occurrence of the signal appearing on line 17 at the output of phase shifter 15. The time delay is determined by the angular displacement of shaft 14. Phase shifter 15 may be a conventional resolver and phase shift network combination well known in the art which is operative to delay an electrical input signal directly in accordance with angular displacement of a mechanical input signal.

The delayed signal appearing on line 17 is applied to pulse generator 18 which produces a sequence of pulses on line 19 having the repetition rate of the essentially sinusoidal phase shifted signal appearing on line 17. The pulses of line 19 are delayed a predetermined amount in delay network 20 to produce the aforementioned locally generated recurrent series of pulses on line 9.

The pulses of line 19 are also applied to a second input of sampling gate 7. Gate 7 is actuated to pass the signal at the output of detector 4 during the occurrences of the pulses of line 19. The sampled signal at the output of gate 7 is applied to low-pass filter 21 which, in turn, delivers only the D.C. component of the sampled signal to controllable threshold circuit 22. Circuit 22 may, for example, be an ordinary diode rectifier having a back bias determined by the D.C. signal appearing on line 23. Should the D.C. signal at the output of filter 21 exceed that of line 23 whereby circuit 22 is rendered conductive, sky wave indicator 24 is energized.

The D.C. signal of line 23 is proportional to the average value of the noise signal at the output of detector 4. Band-pass filter 8 permits only the alternating signal components at the output of detector 4 to be applied to noise detector 25. The output signal of filter 8 is an A.C. signal modulated in amplitude by substantially only the random noise present in the signal at the output of detector 4. Noise detector 25 may be a conventional rectifier-demodulator producing a rectified signal output on line 26 which varies in magnitude according to changes in the amplitudes of the signal at the output of filter 8. The output of detector 25 is applied via line 26 to low-pass filter 27 which passes substantially only the direct component of the signal appearing on line 26 which component is representative of the average value of the noise signal at the output of detector 4. The output of filter 27 is applied via lead 23 to establish the operational threshold of circuit 22.

Sampling gate 6 receives the signals at the output of detector 4 and the pulses of line 9. Gate 6 conducts during the occurrences of the pulses of line 9 and produces a signal representative of the peak value of the signal output of detector 4. The D.C. component of the passed signal is extracted by low pass filter 29 and applied to synchronization indicator 30. The D.C. component also is applied via line 3 to amplifier 2 as an automatic gain control signal.

Figure 2:
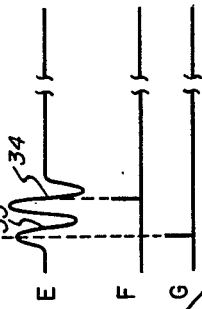
FIG. 2 is a series of waveforms useful in explaining the operation of the apparatus of FIG. 1.

In operation, a recurrent series of pulses are received and detected by antenna 1, the amplifier 2 and detector 4. The detected pulses at the output of detector 4 are shown in waveform A of FIG. 2. Network 5 produces the bidirectional pulses of waveform B in response to the unidirectional pulses of waveform A. To accomplish such a result, network 5 may comprise a signal differentiating network as disclosed in U.S. Patent 2,697,219, issued on December 14, 1954, in the name of Roger B. Williams, Jr., and assigned to the present assignee. It will be seen that waveform B, resulting from the differentiation of waveform A, has a zero crossover point 28 coinciding in time with the peak of waveform A. Crossover point 28 always occurs concurrently with the peak value of waveform A independent of the amplitude of waveform A. Thus, crossover point 28 is stabilized in time and suitable for synchronization of the locally generated recurrent pulses appearing on line 9 of FIG. 1.

The pulses of line 9 are represented in waveform C. The pulses of waveform C may be brought into approximate alignment with the detected pulses A by manual displacement of shaft 14 via control knob 35. The attainment of rough alignment is characterized by an output from low pass filter 29 and the consequent energization of synchronization indicator 30. More precise alignment is accomplished by the action of gate 10, filter 11, amplifier 12, motor 13, phase shifter 15, generator 18 and network 20 which respond to the time difference between crossover 28 of waveform B and the pulses of waveform C. When the pulses of waveform C are properly aligned with crossover point 28, the D.C. signal at the output of filter 11 falls to zero, in turn deenergizing servomotor 13.

In the event that the signals received by antenna 1 contain sky waves as well as ground wave components, the energization of indicator 30 is not unambiguously indicative of proper synchronization. Waveform D is illustrative of a received signal containing both a ground wave 31 and a sky wave 32 signal component as it would appear at the output of detector 4. In the event that the pulses of waveform D are applied to network 5, the sequence of bidirectional pulses E are applied to sampling gate 10. Pulses E contain two stable crossover points 33 and 34 either one of which may determine the synchronization of the pulses on line 9. In the event that the pulses of line 9 are synchronized as shown in waveform F with the second crossover 34 of wave E, improper synchronization is achieved and sky wave indicator 24 is actuated.

When the pulses of waveform F are synchronized with the second crossover 34 of waveform E, the earlier occurring pulses of line 19 will be positioned as shown in waveform G. It will be noted by comparing the position of the pulse of waveform G with the pulse of waveform D that an output signal having a finite D.C. component will be produced at the output of gate 7. Such an output from gate 7 will actuate sky wave indicator 24 to indicate improper synchronization. It will be seen, however, that under certain received signal conditions indicator 24 will not be energized despite the improper synchronization represented by waveforms E and F.

Referring again to FIG. 1, the D.C. signal present at the output of filter 29, in addition to actuating indicator 30, is also applied as an automatic gain control voltage via lead 3 to amplifier 2. In this manner, the gain of amplifier 2 automatically is established in accordance with the strength of the detected signal being sampled in gate 6. In the event that the amplitude of sky wave component 32 is substantially greater than that of ground wave component 31 and should the improper synchronization represented by waveforms E and F be achieved, the automatic gain control voltage of line 3 may be sufficiently great so as to reduce the gain of amplifier 2 to such an extent that the weaker ground wave component 31 will not be detected at all. Under this condition, the amplitude of the D.C. signal at the output of filter 21 might be insufficient to exceed the threshold of circuit 22 whereby indicator 24 would remain deactuated. No improper synchronization indication would be produced.

The function of threshold circuit 22 is to minimize the false actuation of indicator 24 in the presence of random bursts of high level noise in the receiver which bursts may occur during normal and proper synchronization. Should a high level AGC signal be developed or should the gain of amplifier 2 otherwise be reduced, the threshold level of circuit 22 could also be safely reduced without increasing the likelihood of spurious actuation of indicator 24 by random noise. The present invention accomplishes precisely such a result through the operation of components 8, 25 and 27 which produce on line 23 a D.C. signal proportional to the average receiver noise value. Upon the reduction of the receiver noise signal as a result of reduced receiver gain, the threshold of circuit 22 is correspondingly reduced so that the diminished amplitude of the ground wave signal as sampled in gate 7 yet will be sufficient to properly actuate indicator 24. Such actuation of indicator 24 would be precluded in the event that a fixed and predetermined threshold was established for circuit 22 independent of the AGC signal amplitude.

It will be seen from the preceding specification that the objects of the present invention have been achieved in a pulse synchronization system by the provision of means for sensing the amplitude of any signals occurring prior to the signal being synchronized with and means for varying the signal detectability threshold of said sensing means in proportion to the average value of the noise signals present.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Means for indicating improper synchronization between first and second recurrent series of pulses having the same recurrence interval, said second series of pulses having a noise component, said means comprising means responsive to said second series of pulses for providing a control signal related to the amplitude of said noise component, means for generating a third recurrent series of pulses having the same recurrence interval as that of said first and second series of pulses, means coupled to said generating means for producing said first series of pulses from said third series of pulses whereby each of said third series of pulses occurs prior to a corresponding one of said first series of pulses in each recurrence interval, means coupled to said producing means and responsive to said first and second series of pulses for synchronizing said first and second series of pulses, means coupled to said generating means and responsive to said third and second series of pulses for producing an output signal related to the amplitude of said second series of pulses during the occurrences of said third series of pulses, signal utilization means having a controllable signal detectability threshold, means for applying said output signal to said utilization means, and means for applying said control signal to said utilization means to determine said controllable signal detectability threshold.

2. Means for indicating improper synchronization between first and second recurrent series of pulses having the same recurrence interval, said second series of pulses having a noise component, said means comprising means responsive to said second series of pulses for providing a control signal related to the amplitude of said noise component, means for generating a third recurrent series of pulses having the same recurrence interval as that of said first and second series of pulses, means coupled to said generating means for producing said first series of pulses from said third series of pulses whereby each of said third series of pulses occurs prior to a corresponding one of said first pulses in each recurrence interval, means coupled to said producing means and responsive to said first and second series of pulses for synchronizing said first and second series of pulses, means coupled to said generating means and responsive to said third and second series of pulses for producing an output signal related to the amplitude of said second series of pulses during the occurrences of said third series of pulses, signal utilization means, means for applying said output signal to said utilization means, said means for applying having a controllable signal amplitude threshold, and means for applying said control signal to said last-named means to determine said controllable threshold.

3. Means for indicating improper synchronization between first and second recurrent series of pulses having the same recurrence interval, said second series of pulses having a noise component, said means comprising means responsive to said second series of pulses for producing a control signal related to the amplitude of said noise component, means for generating a third recurrent series of pulses, delay means coupled to said generating means for producing said first series of pulses from said third series of pulses, means coupled to said delay means and responsive to said first and second series of pulses for synchronizing said first and second series of pulses, means coupled to said generating means and responsive to said third and second series of pulses for producing an output signal related to the amplitude of said second series of pulses during the occurrences of said third series of pulses, signal utilization means, means for applying said output signal to said utilization means, said means for applying having a controllable signal amplitude threshold, and means for applying said control signal to said last-named means to determine said controllable threshold.

4. Means for synchronizing a first locally generated recurrent series of pulses with a remotely transmitted recurrent series of pulses, said means comprising means for receiving said transmitted pulses, said means for receiving including controllable gain amplifying means, first means coupled to said receiving means for producing a control signal related to the amplitude of the noise component of the received series of pulses, second means for producing a second locally generated recurrent series of pulses, delay means coupled to said second means for deriving said first series of pulses from said second series of pulses, means coupled to said delay means and responsive to said first and said received series of pulses for synchronizing said first and said received series of pulses, means coupled to said second means and to said means for receiving and responsive to said second and said received series of pulses for producing a first output signal related to the amplitudes of said received series of pulses during the occurrences of said second series of pulses, signal utilization means, means for applying said first output signal to said utilization means, said means for applying having a controllable signal amplitude threshold, means for applying said control signal to said last-named means to determine said controllable threshold, means coupled to said delay means and said receiving means and responsive to said first and said received series of pulses for producing a second output signal related to the amplitude of said received series of pulses during the occurrences of said first series of pulses, and means for applying said second output signal to said reeciving means for controlling the gain thereof.

5. Means for synchronizing a first locally generated recurrent series of pulses with a remotely transmitted recurrent series of pulses, said means comprising means for detecting said transmitted pulses, first means coupled to said detecting means for producing a control signal proportional to the amplitude of the noise component of the detected series of pulses, second means for producing a second locally generated recurrent series of pulses, delay means coupled to said second means for producing for deriving said first series of pulses from said second series of pulses, means coupled to said delay means and responsive to said first and said detected series of pulses for synchronizing said first and said detected series of pulses, means coupled to said second means and to said means for detecting and responsive to said second and said detected series of pulses for producing an output signal proportional to the amplitudes of said detected series of pulses during the occurrences of said second series of pulses, signal utilization means, means for applying said output signal to said utilization means, said means for applying having a controllable signal amplitude threshold, and means for applying said control signal to said last-named means to determine said controllable threshold.

6. Means for synchronizing a first locally generated recurrent series of pulses with a remotely transmitted recurrent series of pulses having the same recurrence interval as that of said first series of pulses, said means comprising means for receiving said transmitted pulses, said means for receiving including controllable gain amplifying means, first means coupled to said receiving means for producing a control signal proportional to the amplitude of the noise component of the received series of pulses, second means for producing a second locally generated recurrent series of pulses having the same recurrence interval as that of said first and transmitted series of pulses, third means coupled to said second means for producing said first series of pulses whereby each of said second series of pulses occurs prior to the corresponding one of said first series of pulses in each recurrence interval, means coupled to said third means and to said means for receiving and responsive to said first and said received series of pulses for synchronizing said first and said received series of pulses, means coupled to said second means and to said means for receiving and responsive to said second and said received series of pulses for producing a first output signal proportional to the amplitude of said received series of pulses during the occurrences of said second series of pulses, signal utilization means, means for applying said first output signal to said utilization means, said means for applying having a controllable signal amplitude threshold, means for applying said control signal to said last-named means to determine said controllable threshold, means coupled to said third means for producing and to said means for receiving and responsive to said first and said received series of pulses for producing a second output signal proportional to the amplitude of said received series of pulses during the occurrences of said first series of pulses, and means for applying said second output signal to said receiving means for controlling the gain thereof.

7. Means for indicating improper synchronization between first and second recurrent series of pulses having the same recurrence interval, the pulses of said first series of pulses occurring at substantially the same times as the pulses of said second series of pulses, said second series of pulses having a noise component, said means comprising means responsive to said second series of pulses for producing a control signal related to the amplitude of said noise component, means for generating a third recurrent series of pulses having the same recurrence interval as that of said first and second series of pulses, means coupled to said generating means for producing said first series of pulses from said third series of pulses whereby each of said third series of pulses occurs prior to a corresponding one of said first series of pulses in each recurrence interval, means coupled to said generating means and responsive to said third and second series of pulses for producing an output signal related to the amplitude of said second series of pulses during the occurrences of said third series of pulses, signal utilization means having a controllable signal detectability threshold, means for applying said output signal to said utilization means, and means for applying said control signal to said utilization means to determine said controllable signal detectability threshold.

8. Means for indicating improper synchronization between first and second recurrent series of pulses having the same recurrence interval, the pulses of said first series of pulses occurring at substantially the same times as the pulses of said second series of pulses, said second series of pulses having a noise component, said means comprising means responsive to said second series of pulses for producing a control signal related to the amplitude of said noise component, means for generating a third recurrent series of pulses, delay means coupled to said generating means for producing said first series of pulses from said third series of pulses, means coupled to said generating means and responsive to said third and second series of pulses for producing an output signal related to the amplitude of said second series of pulses during the occurrences of said third series of pulses, signal utilization means having a controllable signal detectability threshold, means for applying said output signal to said utilization means, and means for applying said control signal to said utilization means to determine said controllable signal detectability threshold.

References Cited in the file of this patent
UNITED STATES PATENTS
2,873,444    Dean _____ Feb. 10, 1959